3,813,254
THERMOSETTING NON GELLED HYDROXYL-FUNCTIONAL COATING ON AN INKED METALLIC ARTICLE

Joseph M. Makhlouf, Mars, Pa., assignor to PPG Industries, Inc., Pittsburgh, Pa.
No Drawing. Original application June 21, 1972, Ser. No. 155,274, now Patent No. 3,719,618. Divided and this application Oct. 11, 1972, Ser. No. 296,730
Int. Cl. B41m 1/24
U.S. Cl. 117—12                                    9 Claims

ABSTRACT OF THE DISCLOSURE

Hydroxyl functional polymers can be produced by employing monomers derived from 12-hydroxystearic acid and glycidyl acrylates or methacrylates and reacting said monomers with other unsaturated monomers, thus providing polymers that form suitable thermosetting compositions when the polymers are co-cured with various cross-linking agents or other resinous compositions.

---

This is a division, of application Ser. No. 155,274, filed June 21, 1972, now U.S. Pat. 3,719,618.

BACKGROUND OF THE INVENTION

A number of useful interpolymers of unsaturated carboxylic acid amides, such as acrylamide, methacrylamide and N-butoxymethyl acrylamide have been employed, both as coating liners for the interior metal containers and also as a protective exterior varnish. These interpolymers are generally produced by interpolymerizing an unsaturated carboxylic acid amide with at least one other polymerizable ethylenically unsaturated monomer, and then reacting the interpolymer with an aldehyde, such as formaldehyde, preferably in the presence of an alcohol, such as butanol. Also useful are blends of these unsaturated carboxylic acid amide interpolymers with certain butadiene and modified butadiene resins. These blends, under proper conditions, cure rapidly and can be employed to coat metals such as tin plate, black iron, terneplate and aluminum, at such speed as desirable in the fabrication of containers employed in the packaging of foods and beverages.

In some instances, these interpolymers were undesirable as a coating for food and beverage containers due to an undesirable odor emitted from the interpolymer due to the amide monomer. In an effort to alleviate the odor problem and improve crosslinking, the amide monomers were replaced with unsaturated hydroxyl-functional monomers, such as hydroxyethyl acrylate, hydroxyethyl methacrylate, hydroxypropyl methacrylate and the like.

Interpolymers produced by utilizing unsaturated hydroxyl functional monomers such as hydroxyethyl acrylate, hydroxyethyl methacrylate, hydroxypropyl methacrylate and the like, have not been useful because they produce flocculation of the lithographic inks which are employed in labeling the containers. Thus, it is believed the hydroxyl functional monomers of the present invention prevent flocculation because they are compatible with the lithographic inks employed, that is, the vehicle portion of the inks is compatible with the interpolymers hereinafter described.

Generally, it has been found that if the unsaturated hydroxyl functional monomer is incompatible with the lithographic ink, when, subsequently, the interpolymer containing such monomer is applied over the ink, flocculation will result.

The monomers employed in formulating the interpolymers of this invention also add improved slip and abrasion resistance to the coating compositions utilizing such interpolymers.

However, these hydroxyl-functional acrylic systems, when applied over wet lithographic inks, caused flocculation of the inks and thus produced an undesirable appearance and a decrease in the resistance of the coating at the flocculated areas.

It may be noted that the present interpolymers differ from the products derived from poly(12-hydroxystearic acid) and glycidyl methacrylate, which have previously been used in the formulation of stabilizers for polymer dispersion. Poly(12-hydroxystearic acid) is not employed in the present invention and the desired monomer can only be produced by utilization of monomeric 12-hydroxystearic acid.

DESCRIPTION OF THE INVENTION

It has now been discovered that desirable hydroxyl functional interpolymers are obtained by employing a unique monomer derived from 12-hydroxystearic acid and a glycidyl ester of an unsaturated carboxylic acid. When used in compositions applied over wet lithographic inks, they provide thermoset coatings of excellent properties and do not result in undesirable flocculation of the lithographic inks.

The invention herein may be generally described as a heat-hardening, non-gelled, hydroxyl functional coating composition comprising a reaction product of 12-hydroxystearic acid and a glycidyl ester of an unsaturated carboxylic acid; an ethylenically unsaturated ester of an organic or inorganic acid; an alpha, beta-ethylenically unsaturated carboxylic acid; one or more other alpha, beta-ethylenically unsaturated monomers; and a crosslinking agent.

When the 12-hydroxystearic acid is reacted with a glycidyl ester of an unsaturated carboxylic acid, the oxirane ring is cleaved forming a pendent hydroxyl group and attaching the two reactants by means of an ester linking, thus forming the monomer.

The reaction is carried out in the presence of heat and the small amount of catalyst, such as N,N - dimethylcocoanut amine, may be employed to accelerate the reaction. Likewise, various other components that are known to catalyze such reaction may be readily employed where desirable. Since the reactants are heated, a small amount of inhibitor, such as hydroquinone, may be added to prevent homopolymerization of the unsaturated glycidyl esters, for it is desirable to preserve the double bonds for subsequent polymerization with the other unsaturated monomers when the interpolymer is prepared.

The reaction product of this invention is usually prepared in a suitable aliphatic or aromatic solvent, such as xylene, toluene or the like. Such solvent aids in controlling the reaction and the final viscosity of the product.

The unsaturated glycidyl esters that are employed include those derived from carboxylic acids, for example, lower aliphatic monocarboxylic acid such as acrylic, methacrylic, crotonic, isocrotonic, propiolic; intermediate aliphatic acids such as sorbic and the like; higher aliphatic monocarboxylic acids such as oleic, linoleic, elaidic, alpha-eleostearic, erucic and the like; and di- and trialiphatic carboxylic acids such as maleic, fumaric, itaconic, acetylenidicarboxylic, aconitic and the like.

However, the preferred acids are the lower aliphatic alpha, beta-ethylenically unsaturated monocarboxylic acids such as acrylic and methacrylic.

The interpolymers produced utilizing the above-described reaction product usually comprise (a) from about 4 to about 20 percent by weight of the reaction product; (b) from about 5 to about 20 percent by weight of an ethylenically unsaturated ester of an organic or inorganic acid; (c) from about 0.5 to about 3.0 percent by weight of an alpha, beta-ethylenically unsaturated carboxylic acid; (d) from about 55 to about 90 percent by weight of one or more other alpha, beta-ethylenically unsaturated monomers; and from about 5 to about 30 percent of a crosslinking agent based on total weight of the above components and said crosslinking agent.

The esters of organic or inorganic acids include such esters as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethylhexoate, allyl benzoate, allyl acrylate, allyl crotonate, allyl oleate, allyl chloroacetate, allyl trichoroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters as well as esters from such alkenyl alcohols as beta-ethyl allyl alcohol, beta-propyl allyl alcohol, 1-butene-4-ol, 2-methylbutene-ol-4, 2(2,2-dimethylpropyl)-1-butene-4-ol and 1-pentene-4-ol;

Methyl alpha-chloroacrylate, methyl alpha-bromoacrylate, methyl alpha-fluoroacrylate, methyl alpha-iodoacrylate ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyanoacrylate, ethyl alpha - cyanoacrylate, amyl alpha-cyanoacrylate and decyl alpha-cyanoacrylate; and dimethyl maleate, diethyl maleate, dimethyl fumarate, diethyl glutaconate, and the like.

The preferred esters are lower alkyl esters of acrylic or methacrylic acid, such as methyl acrylate, ethyl acrylate, butyl acrylate, methyl methacrylate, ethyl methacrylate, butyl methacrylate and the like.

The preferred monoethylenically unsaturated acid used in producing the interpolymers of this invention is acrylic or methacrylic acid, although other unsaturated monocarboxylic and dicarboxylic acids of up to about 6 carbon atoms, such as maleic acid, fumaric acid, crotonic acid, methyl hydrogen fumarate, butyl hydrogen maleate, 3-butenoic acid, angelic, tiglic acid, itaconic acid and the like, may be used.

The alpha-beta-ethylenically unsaturated monomer may be any monomer containing a $CH_2=C<$ group, preferably activated by a negative substituent. Included among the useful monomers possessing the $CH_2=C<$ grouping are:

(1) Monoolefinic and diolefinic hydrocarbons, that is, monomers containing only atoms of hydrogen and carbon, such as styrene, alpha-methyl styrene, alpha-ethyl styrene, alpha-butyl styrene, isobutylene, 2,3 - dimethyl-butene-1, 2,3-dimethyl-pentene-1, 2,4-dimethyl-pentene-1, 2,3,3-trimethyl-butene-1, 2-methyl-3-ethyl-pentene-1, 2 - methyl-octene-1, 2,6-dimethyl-heptene-1;

(2) Halogenated monolefinic and diolefinic hydrocarbons such as alpha-chlorostyrene, alpha - bromostyrene, 2,5-dichlorostyrene, 2,5-dibromostyrene, 3,4 - dichlorostyrene, 3,4-difluorostyrene, 2,4,5-trichlorostyrene, 2-chlorohexene, 2-fluorohexene, 4 - bromoheptene, 1,2-difluorolate, butyl acrylate, methyl methacrylate, ethyl methacryoctene-1, 2,6-dimethyl-heptene-1;

(3) Organic nitriles such as acrylonitrile, methacrylonitrile, ethacrylonitrile, 3-butenoic acid, 3-octenenitrile, crotonitrile, oleonitrile, and the like; and (4) Amides such as acrylamide, methacrylamide, N-butoxymethyl methacrylamide and the like.

The above polymerizable olefinic monomers are representative only, and do not include all of the $CH_2=C<$ containing monomers which may be employed.

The preferred olefinic monomers include styrene, acrylamide and acrylonitrile.

The hydroxyl functional unsaturated monomer is of the type hereinabove described.

The procedure for polymerizing such components is that which is commonly known in the art.

Ordinarily in carrying out the polymerization reaction a peroxygen type catalyst is utilized. Useful catalysts include acetyl benzoyl peroxide, hydroxyheptyl peroxide, methyl ethyl ketone peroxide, cyclohexanone peroxide, cyclohexyl hydroperoxide, 2,4 - dichlorobenzoyl peroxide, cumene hydroperoxide, dicumyl peroxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate and the like. Two of the most economical of the above peroxygen compounds which are entirely satisfactory in most instances are cumene hydroperoxide and benzoyl peroxide. Cumene hydroperoxide can advantageously be employed at high reflux temperatures, whereas the benzoyl peroxide can be utilized successfully at the lower reflux temperatures.

Also, the diazo compounds such as alpha-alpha-azo-diisobutyronitrile, azobisisobutyronitrile or p - methoxyphenyldiazo-thio-(2-naphthyl)ether may also be used as polymerization catalysts in the preparation of the above-described interpolymers.

The quantity of catalyst employed can be varied considerably; however, in most instances it is desirable to utilize from about 0.1 percent to 2.0 percent by weight based on weight of the monomeric components.

Since it is desirable that the interpolymers be of relatively low molecular weight so they can be dissolved at high solids and low viscosities, a chain-modifying agent or chain-terminator is ordinarily added to the polymerization mixture. The mercaptans, such as dodecyl mercaptan, tertiary dodecyl mercaptan, octyl mercaptan, hexyl mercaptan and the like, are conventionally used for this purpose. However, other chain-modifying agents such as cyclopentadiene, allyl acetate, allyl carbamate, alpha-methyl styrene dimers, and alpha-methyl styrene itself, can be used to secure low molecular weights, as can unsaturated fatty acid esters. Aromatic hydrocarbons in the reaction mixture also are of assistance in maintaining low molecular weight.

After the desired interpolymer is obtained, it may be conveniently blended or mixed with a crosslinking agent which enhances the cure and film integrity. Generally, the crosslinking agent may be incorporated from about 5 percent to about 30 percent based on interpolymer solids, although as high as 50 percent and as low as one percent crosslinking agent may be employed with desirable results.

For example, amino resins, such as aldehyde condensation products, perform well. These include aldehyde condensation products of melamine, urea, benzoguanamine, acetoguanamine, or similar compounds.

Co-curing resins can also be blended or mixed with the above-described interpolymers and crosslinking agents, when desirable, to produce a particular result. Resins that may be employed include alkoxysilanes such as amyl triethoxysilane, and the like.

Aldehyde-modified unsaturated carboxylic acid amide interpolymer compositions disclosed and claimed in U.S. Pat. No. 3,307,963 may be employed.

Often minor amounts of alkyd resins (U.S. Pat. No. 2,940,945), epoxy resins (U.S. Pat. No. 2,870,117), vinyl halide resins (U.S. Pat. No. 2,870,116) and nitro-cellulose (U.S. Pat. No. 2,940,943) are admixed and co-cured. Generally, all of the alkyd resins, such as short oil-modified resins, medium oil-modified and long-oil modified resins, may be utilized.

The particular epoxy resin used may vary considerably in chemical structure. These materials which are ordinarily polyglycidyl ethers of bisphenols, or polyether derivatives of polyglycidyl phenols containing epoxide groups, are formed by the reaction of bisphenols with epichlorohydrin, and range from viscous liquids to hard, brittle resins. In addition to the epoxy resins which are prepared with a polyhydride phenol and a chloroepoxy compound, the epoxidized ring compounds such as disclosed in U.S. Pat. No. 2,716,123 may also be used.

Aldehyde-modified unsaturated carboxylic acid amide interpolymers blended with an adduct of a hydroxyl-containing polymer and a carboxylic acid anhydride can readily be co-cured.

In addition to the above-mentioned co-curing resins, there may be employed minor amounts of various isocyanates. Generally, a wide variety of organic diisocyanates may be used, for example, aromatic, aliphatic and cycloaliphatic diisocyanates. Representative compounds include 2,4 - tolylene diisocyanate, m-phenylene diisocyanate, 4,4′ - bisphenylene diisocyanate, 1,5-naphthylene diisocyanate, 1,4 - tetramethylene diisocyanate, 1,4 - cyclohexylene and the like. Arylene diisocyanates, i.e., those in which each of two isocyanate groups is attached to an aromatic ring, are preferred. These diisocyanates may contain other constituents, although those that are free from reactive groups other than the two isocyanate groups are ordinarily preferred.

The co-curing resins and isocyanates may be used to the exclusion of a crosslinking agent or in addition to the crosslinking agent. The amount of the co-curing resin and isocyanate can vary depending on the particular property or characteristic desired.

The resinous compositions of this invention are readily adaptable to pigmentation by utilization of pigments known in the art. For example, titanium dioxide, encapsulated aluminum, silica, lead silico chromate, carbon black, talc, barium sulfate, and the like, as well as combinations of these and similar pigments may be used. Color pigments such as cadmium red, cadmium yellow, phthalocyanine blue, phthalocyanine green, chrome green, toluidine red, hydrated iron oxide, and the like may be included if desired. Also, generally incorporated into the pigment composition is a dispersing agent, a surface-active agent, or adhesion-enhancing agents. The surface-active agent can be nonionic, anionic or cationic, or a combination thereof. Dispersing agents such as ethoxylated alkyl phenyl phosphate can be employed. Adhesion-enhancing agents such as cellulose acetate butyrate may be added in sufficient amounts to provide the required adhesion.

Other components which may be included in these coating compositions, if desired, include, for example, melting agents, flow agents, fungicides, anti-oxidants and the like.

Set forth below are several specific embodiments of the preparation of the coating compositions of this invention. These embodiments are illustrative and are not to be construed as limiting the invention. All parts and percentages are based upon non-volatile solids content and are by weight unless otherwise indicated.

A monomer suitable for incorporation into the interpolymers of this invention may be prepared in the following manner:

A reactor equipped with a stirrer, thermometer and a reflux condenser was charged with the following components:

| | Parts by weight |
|---|---|
| Xylene | 800.0 |
| 12-Hydroxystearic acid | 816.0 |
| N,N-dimethylcocoanut amine (dissolved in 50 parts xylene) | 4.0 |

The contents were heated to reflux and after all the 12-hydroxystearic acid was in solution, 384 parts glycidyl methacrylate and 1.5 parts hydroquinone were added to the reactor over a 3-hour period. The reaction was then cooled and the monomer produced had the following characteristics:

| | |
|---|---|
| Acid number | 8.21 |
| Solids content (percent) | 55.7 |
| Viscosity (Gardner-Holdt) | A— |
| Color (Gardner) | 8+ |

The above monomer was employed to produce the following interpolymers, which may be successfully utilized in formulating suitable coating compositions of this invention.

Interpolymer A

A reactor was charged with 500 parts of toluene and heated to reflux, and the following components were added over an hour period:

| | Parts by weight |
|---|---|
| Styrene | 380.0 |
| Butyl acrylate | 50.0 |
| Reaction product (above) | 100.0 |
| Methacrylic acid | 10.0 |
| Azobisisobutyronitrile | 5.0 |
| Tertiary dodecyl mercaptan | 2.5 |

A mixture of 100 parts of Cellosolve acetate and 2.5 parts azobisisobutyronitrile was added over an additional 2-hour period. Upon cooling the reaction, the interpolymer had the following characteristics:

| | |
|---|---|
| Solids content (percent) | 35.5 |
| Viscosity (Gardner-Holdt) | A— |

Interpolymer B was produced in a manner similar to that of Interpolymer A, except for monomer amounts and a catalyst variation.

The following components were added over a 3-hour period to a refluxing reactor containing 500 parts of xylene:

| | Parts by weight |
|---|---|
| Styrene | 858 |
| Butyl acrylate | 110 |
| Reaction product (as in Interpolymer A) | 183 |
| Butyl peroxyisopropyl carbonate | 5 |
| Tertiary dodecyl mercaptan | 9 |

After the above addition, a solution of 300 parts xylene and 3.8 parts butyl peroxyisopropyl carbonate were added over a 3-hour period, then the reaction was cooled and was further reduced with 100 parts of xylene.

Interpolymer B had the following characteristics:

| | |
|---|---|
| Acid number | 0.59 |
| Solids content (percent) | 51.6 |
| Viscosity (Gardner-Holdt) | M—N |
| Color (Gardner) | 2 |

Interpolymer C

Interpolymer C was produced in a manner similar to that of Interpolymer B and was comprised of similar monomers, except that butyl acrylate was replaced by methyl methacrylate. This interpolymer had the following characteristics:

| | |
|---|---|
| Solids content (percent) | 52.2 |
| Viscosity (Gardner-Holdt) | Y– |
| Acid number | 7.10 |
| Color (Gardner) | 1 |

Interpolymer D

Interpolymer D was similar to that of Interpolymer C, except that the styrene content in Interpolymer D was reduced by 5 percent, whereas the 12-hydroxystearic glyceryl methacrylate content was increased by 5 percent. Interpolymer D had the following characteristics:

| | |
|---|---|
| Solids content (percent) | 52.2 |
| Viscosity (Gardner-Holdt) | X+ |
| Acid number | 7.10 |
| Color (Gardner) | 1 |

Another variation of the 12-hydroxystearic glyceryl methacrylate monomer which is useful may be produced in the following manner:

A reactor was charged with the following components and heated to reflux.

| | Parts by weight |
|---|---|
| Toluene | 500 |
| 12-Hydroxystearic acid | 750 |
| Glycidyl methacrylate | 390 |
| Hydroquinone | 1.35 |
| N,N-dimethylcocoanut amine | 2.35 |

Such carge, after heating to reflux, was maintained at refluxing conditions for 4 hours and thereafter cooled. The above monomer had the following characteristics:

| | |
|---|---|
| Solids content (percent) | 63.4 |
| Acid number | 2.08 |
| Viscosity (Gardner-Holdt) | A– |
| Color (Gardner) | 4+ |

Below are listed several examples of wet ink varnishes which were formulated by the incorporation of the hereinabove described interpolymers.

EXAMPLE I

| | Parts by weight |
|---|---|
| Interpolymer A (above) | 41.0 |
| Melamine-formaldehyde resin (60 percent solids content, 100 percent butylated) | 26.0 |
| Plasticizer (Wyandotte Chemical—Pluracol TP–2540) | 4.0 |
| Epoxy resin (Shell—Epon 828) | 2.0 |
| Petrolatum solution (1.0 part Petrolatum and 1.2 parts mineral spirits) | 2.0 |
| Flow agent (sold commercially as "Modaflow") | 0.01 |
| Solvesso 150 | 24.99 |

The above coating composition may readily be applied over numerous lithographic inks such as those comprising an oil-hydrocarbon or isophthalic alkyd vehicle and subsequently baked to form tough continuous films which are compatible with the said inks.

For example, the coating composition of Example I may be applied by direct roll coat to continuous coils of tin-free steel or aluminum, subsequently baked and then fabricated into beverage and food containers. Containers coated with such composition are quite desirable for a number of reasons, for example, these compositions have low or no odor, thus making such containers more desirable from a commercial standpoint. The wet and dry adhesion is also quite acceptable for such use. In addition, the fabrication of metals coated with such compositions is quite good, for example, these coated metals can be bent 180° and still show little or no cracking.

Another interpolymer which may be used in a manner described above in Example I is Inteprolymer B.

EXAMPLE II

| | Parts by weight |
|---|---|
| Interpolymer B | 48.0 |
| Melamine-formaldehyde resin (60 percent solids content, 100 percent butylated) | 12.30 |
| Plasticizer (Wyandotte Chemical—Pluracol TP–2540) | 5.70 |
| Epoxy resin (Shell—Epon 828) | 2.00 |
| Petrolatum solution (1.0 part Petrolatum and 1.2 parts mineral spirits) | 2.00 |
| Flow agent (sold commercially as "Modaflow") | 0.01 |
| Solvesso 150 | 29.99 |

Example II may be applied in a manner similar to that of Example I with equally desirable results.

Numerous other coating compositions can be formulated by utilizing Interpolymers C, D and the like. The monomer type and percent may be modified to provide suitable compositions.

The crosslinking agent may also be varied as desired, for example, formaldehyde condensation resins such as the commercially available melamine and urea resins may be used. These include urea-formaldehyde condensation resins having urea/formaldehyde/butanol ratios of 1:2.2:1.6, 1:2.4:1.7 and 1:3.2:1.8 and melamine-formaldehyde condensation resins having melamine/formaldehyde/butanol ratios of 1:6:5.3, 1:6:4.3 and 1:6:4.

The co-curing resins, such as alkyds, epoxies, vinyl halides and the like, may be added in addition to the cross-linking agent when specific coating characteristics are desired.

In some cases, these compositions may be pigmented when the particular application so requires it. Any of the conventional pigments used in the art may be incorporated to produce protective and decorative compositions.

Other additives may be added voluntarily. These include dispersing agents, flow agents, fungicides, antioxidants, and the like.

Although specific examples have been set forth hereinabove, it is not intended that the invention be limited solely thereto, but include all of the variations and modifications falling within the scope of the appended claims.

What is claimed is:

1. A metallic article having thereon a lithographic ink comprising of an oil-hydrocarbon or isophthalic alkyd vehicle under a cured layer of a coating composition comprising:

(A) an interpolymer of:

(a) from about 4 to about 20 percent of a reaction product of 12-hydroxystearic acid and a glycidyl ester of a monoethylenically unsaturated carboxylic acid;

(b) from about 5 to about 20 percent of monoethylenically unsaturated ester of an organic or inorganic acid;

(c) from about 0.5 to about 3 perecnt of an alpha, beta-monoethylenically unsaturated carboxylic acid; and (d) from about 55 to about 90 percent of one or more other alpha, beta-monoethylenically unsaturated monomers;

(B) from about 5 to about 30 percent by weight, based on total weight of (A) and (B), of a crosslinking agent selected from a member of the class consisting of condensation products of an aldehyde and melamine or benzoguanamine for said interpolymer.

2. An article as in claim 1 wherein the said reaction product is the reaction product of 12-hydroxystearic acid and glycidyl acrylate or methacrylate.

3. An article as in claim 1 wherein the unsaturated esters are lower alkyl esters of acrylic and methacrylic acid.

4. An article as in claim 3 wherein the lower alkyl ester is selected from a member of the class consisting of methyl acrylate, ethyl acrylate, butyl acrylate, ethyl methacrylate, methyl methacrylate, and butyl methacrylate.

5. An article as in claim 1 wherein the alpha, beta-monoethylenically unsaturated acid is acrylic or methacrylic acid.

6. An article as in claim 1 wherein the alpha, beta-monoethylenically unsaturated monomer is selected from a member of the class consisting of vinyl aromatic hydrocarbons, organic nitriles and amides.

7. An article as in claim 6 wherein the alpha, beta-monoethylenically unsaturated monomer is selected from a member of the class consisting of styrene, acrylamide and acrylonitrile.

8. An article as in claim 1 wherein the crosslinking agent is a butylated melamine formaldehyde resin.

9. An article as in claim 1 wherein the said article is a metal container.

References Cited

UNITED STATES PATENTS 2,597,864   5/1952   Greubel _____ 117—12
2,895,846   7/1959   Schaefer _____ 117—12

RONALD H. SMITH, Primary Examiner

W. H. LOVIE, Jr., Assistant Examiner

U.S. Cl. X.R.

117—75, 94, 132 B, 132 BE, 161 UT, 161 ZB, 161 LN; 260—21